US009423527B2

(12) United States Patent
Macquin

(10) Patent No.: US 9,423,527 B2
(45) Date of Patent: Aug. 23, 2016

(54) AUTONOMOUS CLEANING DEVICE FOR SEISMIC STREAMERS AND METHOD

(71) Applicant: CGG SERVICES SA, Massy (FR)

(72) Inventor: Raphael Macquin, Montrouge (FR)

(73) Assignee: CGG SERVICES SA, Massy (FR)

( * ) Notice: Subject to any disclaimer, the term of this patent is extended or adjusted under 35 U.S.C. 154(b) by 296 days.

(21) Appl. No.: 14/156,818

(22) Filed: Jan. 16, 2014

(65) Prior Publication Data

US 2014/0254311 A1    Sep. 11, 2014

Related U.S. Application Data

(60) Provisional application No. 61/792,308, filed on Mar. 15, 2013, provisional application No. 61/774,922, filed on Mar. 8, 2013.

(51) Int. Cl.
*G01V 1/38* (2006.01)
*G01V 13/00* (2006.01)

(52) U.S. Cl.
CPC .. *G01V 13/00* (2013.01); *G01V 1/38* (2013.01)

(58) Field of Classification Search
CPC ................................. G01V 13/00; G01V 1/38
USPC ........................................ 367/15; 15/3; 134/6
See application file for complete search history.

(56) References Cited

U.S. PATENT DOCUMENTS

| 5,026,212 | A | 6/1991 | Do |
| 5,765,968 | A | 6/1998 | Lee |
| 7,145,833 | B1 | 12/2006 | Hoogeveen |
| 7,409,919 | B2 | 8/2008 | Hoogeveen et al. |
| 7,754,018 | B2 | 7/2010 | Lepage et al. |
| 2005/0268835 | A1 | 12/2005 | Le Page et al. |
| 2006/0054186 | A1 | 3/2006 | Lepage et al. |
| 2008/0127875 | A1 | 6/2008 | Hoogeveen et al. |
| 2011/0197919 | A1 | 8/2011 | Tilley |

(Continued)

FOREIGN PATENT DOCUMENTS

| JP | 2012040538 A | 3/2012 |
| WO | 2010/048039 A2 | 4/2010 |
| WO | 2012/154055 A1 | 11/2012 |

OTHER PUBLICATIONS

International Search Report mailed Sep. 11, 2014, in related International Application No. PCT/EP2014/054601 (Three of the US patent documents were provided with the IDS filed Jan. 16, 2014).

(Continued)

*Primary Examiner* — Daniel L Murphy
(74) *Attorney, Agent, or Firm* — Patent Portfolio Builders PLLC

(57) ABSTRACT

A cleaning device for cleaning a marine element towed in water and related methods are provided. The cleaning device includes a body configured to enclose the marine element; at least one wing attached to the body and configured to impart translational and rotational motion to the body when interacting with the water; a switching and locking mechanism configured to change an orientation of the at least one wing between a first orientation and a second orientation when contacting a stopper and also to lock the selected orientation; rotating means attached to an internal surface of the body and configured to contact the marine element, the rotating means having axles that make a fix angle with a longitudinal axis of the body; and a cleaning tool attached to the body and configured to clean the marine element.

19 Claims, 15 Drawing Sheets

(56) References Cited

U.S. PATENT DOCUMENTS

2012/0176860 A1 7/2012 Stenzel et al.
2012/0222709 A1 9/2012 Karlsen et al.
2013/0028052 A1 1/2013 Routh et al.
2013/0265850 A1 10/2013 Wu

OTHER PUBLICATIONS

Written Opinion mailed Sep. 11, 2014, in related International Application No. PCT/EP2014/054601.
Extended European Search Report in related European Application No. 14162720.8, dated Jul. 29, 2015.
Dong, S., et al., "Least-squares reverse time migration: towards true amplitude imaging and improving the resolution", SEG 83rd Annual International Meeting, Las Vegas, Nevada, Technical Program Expanded Abstracts, Sep. 1, 2012, pp. 1-5.
Paffenholz, J., et al., "Subsalt multiple attenuation and imaging: observations from the Sigsbee2B synthetic data", SEG International Exposition and 72nd Annual Meeting, Salt Lake City, Utah, Expanded Abstracts, Oct. 6-11, 2002, pp. 1-4.
Xu, S., et al., "3D angle gathers from reverse time migration", Geophysics, vol. 76, No. 2, Mar.-Apr. 2011, pp. S77-S92.
Zhang, Y., et al., "Practical Issues of Reverse Time Migration—True-amplitude Gathers, Noise Removal and Harmonic-source Encoding", First Break, vol. 26, Jan. 2009, pp. 29-35, XP002742114.
Zhang, Y., et al., "Predicting multiples using a reverse time demigration", SEG 83rd Annual International Meeting, Las Vegas, Nevada, Expanded Abstracts, Sep. 1, 2012, pp. 1-5.
Extended European Search Report in related European Application No. 14158088.6, dated Aug. 3, 2015.

AUTONOMOUS CLEANING DEVICE FOR SEISMIC STREAMERS AND METHOD

BACKGROUND

1. Technical Field

Embodiments of the subject matter disclosed herein generally relate to cleaning devices for streamers used in marine seismic surveying and, more particularly, to autonomous cleaning devices and related methods for cleaning marine growth and other contaminants deposited on the streamers towed underwater.

2. Discussion of the Background

Marine seismic surveying investigates and maps the structure and character of geological formations under a body of water using reflection seismology. Reflection seismology is a method of geophysical exploration especially helpful in the oil and gas industry. In marine reflection seismology, the depth and the horizontal location of features causing reflections of seismic waves are evaluated by measuring the time it takes for the seismic wave to travel to receivers. These features may be associated with subterranean hydrocarbon reservoirs.

A typical marine seismic surveying system is illustrated in FIG. 1. A vessel 100 tows a seismic source 102 and plural streamers 106, each streamer carrying an array of seismic receivers 104 (e.g., hydrophones). It is desirable to maintain the streamers at predetermined horizontal cross-line distances (i.e., along an axis perpendicular to the towing direction T), and at predetermined depths (e.g., 10 m) relative to the water surface 108. The seismic source 102 is configured to generate a seismic wave 110 that propagates downward (down, up and vertical being defined relative to gravity) toward the seafloor 120 and penetrates formations 125 under seafloor 120 until it is eventually reflected at discontinuity locations such as 122a and 122b. The reflected seismic waves 130a and 130b propagate upwardly and can be detected by one of receivers 104 on streamer 106. Based on the data collected by receivers 104, an image of the subsurface formation is generated by further analyses of the collected data.

To maintain the streamers at a desired position (i.e., such as to have predetermined cross-line distances and predetermined depths), conventionally, a head float 140 and a tail buoy 150 are attached to the streamer. Position control devices 150 (e.g., birds) may be attached to streamer, every 300 m, to control a position of the streamer.

Significant amounts of bio-fouling settlement accumulate on the exterior surface of the streamers. These accumulations can obscure the reflected seismic wave and significantly increase the streamer drag. The rate of accumulation and the impact of the bio-fouling and other contaminants depend on factors, among others, such as the geographic location, the water temperature, and the season. The gooseneck barnacle is the most common bio-fouling organism found on the marine streamers.

Cleaning such contaminants from the exterior of the streamers is desirable and beneficial. For example, a cleaning device 160 may be moved along the streamer to clean contaminants from the exterior thereof.

A conventional cleaning device, such as the one disclosed in U.S. Pat. No. 7,754,018, typically includes one or more cleaning elements (e.g., brushes) and a mechanism configured to attach and to roll the cleaning device along the streamer in order to clean the exterior of thereof. The cleaning device may include buoyant bodies.

A conventional cleaning device 165 described in U.S. Pat. No. 7,145,833 and illustrated in FIG. 2 has two vanes (e.g., 170a and 170b) attached to a cylindrical body 175 formed by two half cylinders 177 engaged on one side by hinges 179 and on another by any suitable releasable fastener (not shown). Brushes 180 are attached inside the body 175 via inserts 185 to reach the outer surface of the streamer 106. The vanes are angled with respect to longitudinal axis of the body 175 to provide both thrust and torque to the body 175.

Most conventional cleaning devices are passive devices that are moved relative to the streamer by the water flow. They are deployed at the front of the streamer (i.e., close to the towing vessel) and picked up at the end of the streamer, after a cleaning operation along the streamer. The cleaning devices are then manually repositioned for another cleaning operation along the same streamer or another streamer. Human intervention in retrieving and repositioning the cleaning devices is a source of inefficiency, is dangerous while performing the seismic survey, and renders the cleaning of the streamer expensive.

An active cleaning device is described in U.S. Pat. No. 7,409,919. This cleaning device includes a turbine rotated by the water flow caused by the movement of the streamer through the water, and a drive element configured to convert the rotation of the turbine into motion of the cleaning device along the seismic streamer. The drive element includes wheels or other mechanisms that are in contact with and moving relative to the streamer. In order to reverse the motion from upstream (i.e., in the towing direction) to downstream (i.e., in a direction opposite to the towing direction) the pitch of the turbine blades is changed. This cleaning device has the disadvantage that the turbine and the drive train can be damaged by seaweed or fish line entangled on the moving parts dragged through the water. Additionally, since the drive elements are constantly in tight frictional contact (e.g., loaded by spring suspension) with the streamer, it may at times be difficult for the cleaning device to roll over the contaminants deposited on the streamer's outer surface, and it occasionally may be even impossible to pass obstacles with larger diameter, such as, weights or bird collar overmolds that are often seen along streamer sections.

Another approach is disclosed in Tilley, U.S. Patent Application Publication Serial no. 2011/0197919, the entire content of which is incorporated herein by reference. Tilley discloses, as illustrated in FIG. 3, a device 300 having external vanes 302 which, when interacting with the water flow, determine a rotation of device 300. Plural wheels 310 are located inside device 300 and contact streamer 312. The axes of wheels 310 make an angle with streamer 312 so that, when device 300 rotates, it also translates along streamer 312 executing a corkscrew motion as indicated by arrow 314. A switch 316 is connected to a lever 318 and when switch 316 contacts a bird or another obstacle, lever 318 changes an orientation of wheels 310 so that device 300 translates in the opposite direction along streamer 312. In other words, vanes 302 are permanently oriented in a certain direction and continuously rotate device 300 along direction 314. The change in the wheels' direction, due to lever 318 and switch 316, makes the device to travel back and forth along the streamer.

However, changing the direction of the wheels' axes may become challenging in time, as the mechanism is prone to failure. Also, any debris or marine contaminant that may enter inside device 300, may block lever 318 or the rotation of wheels 310, thus, rendering this device inoperable.

Therefore, there is a need to develop cleaning devices for streamers that operate, autonomously, up and down the streamers and also to have reliable mechanical parts that are not prone to failure.

BRIEF SUMMARY OF THE INVENTION

The recently developed streamer positioning devices (birds) have rendered the conventional streamer cleaning devices obsolete, because it became impractical or impossible to pass over the birds. Cleaning devices and related methods according to various embodiments provide an efficient streamer cleaning solution, being designed to clean portions of the streamers between neighboring birds and to remain mounted on these streamer portions when not actively used. The cleaning device is designed to be able to operate autonomously, without requiring human intervention on a regular basis.

According to an embodiment, there is a cleaning device for cleaning a marine element that is towed in water. The cleaning device includes a body configured to enclose the marine element; at least one wing attached to the body and configured to impart translational and rotational motion to the body when interacting with the water; a switching and locking mechanism configured to change an orientation of the at least one wing between a first orientation and a second orientation when contacting a stopper and also to lock the selected orientation; rotating means attached to an internal surface of the body and configured to contact the marine element, the rotating means having axles that make a fix angle with a longitudinal axis of the body; and a cleaning tool attached to the body and configured to clean the marine element. The first orientation of the at least one wing makes the body to rotate along a first direction about the marine element and the second orientation of the at least one wing makes the body to rotate along a second direction about the marine element.

According to another embodiment, there is a cleaning device for cleaning a marine element that is towed in water. The cleaning device includes a body configured to enclose the marine element; at least one wing attached to the body and configured to impart translational and rotational motion to the body when interacting with the water; a ring configured to change an orientation of the at least one wing between a first orientation and a second orientation when contacting stoppers when sliding along a longitudinal axis of the body; a switching and locking mechanism configured to actuate the ring and to lock in place the selected orientation of the at least one wing; rotating means attached to an internal surface of the body and configured to contact the marine element, the rotating means having axles that make a fix angle with the longitudinal axis of the body; and a cleaning tool attached to the body and configured to clean the marine element. The first orientation of the at least one wing makes the body to rotate along a first direction about the marine element and the second orientation of the at least one wing makes the body to rotate along a second direction about the marine element.

According to still another embodiment, there is a marine seismic system that includes a streamer; first and second stoppers mounted on the streamer; and a cleaning device mounted on the streamer and configured to travel along the streamer, between the first and second stoppers and to clean the streamer. The cleaning device has been described in the above paragraphs.

According to yet another embodiment, there is a method for cleaning a seismic element while being towed in water. The method includes attaching first and second stoppers to the seismic element; mounting a cleaning device on the seismic element, between the first and second stoppers; changing a wing orientation of the cleaning device to make it move back and forth between the first and second stoppers; and cleaning the seismic element while moving between the first and second stoppers.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer cleaning device used in marine seismic surveying. However, the embodiments to be discussed next are not limited to operating on streamers, but may be applied to cleaning portions of other cable-like structures.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Cleaning devices, according to various embodiments described below, facilitate maintaining free of bio-fouling and other contaminants streamer portions between obstacles that are too large to be passed over. A streamer may have plural cleaning devices positioned to clean at least the portions of the streamer having a high rate of accumulation of bio-fouling and other contaminants. Cleaning devices may be mounted on all the portions of the streamers. These cleaning devices remain attached to the streamer portions when not used for a cleaning operation. The novel cleaning device operates autonomously during the seismic survey, without using electric or pneumatic pressure from the streamer or the vessel. A movement of the cleaning device is produced by the water flow. The overall cost of having plural cleaning devices is mitigated by reduced operating cost for manual barnacle cleaning, and by using cleaning devices only at sections that are hard to reach and have stronger barnacle growth (e.g., the front most sections in each streamer).

Figure 1:
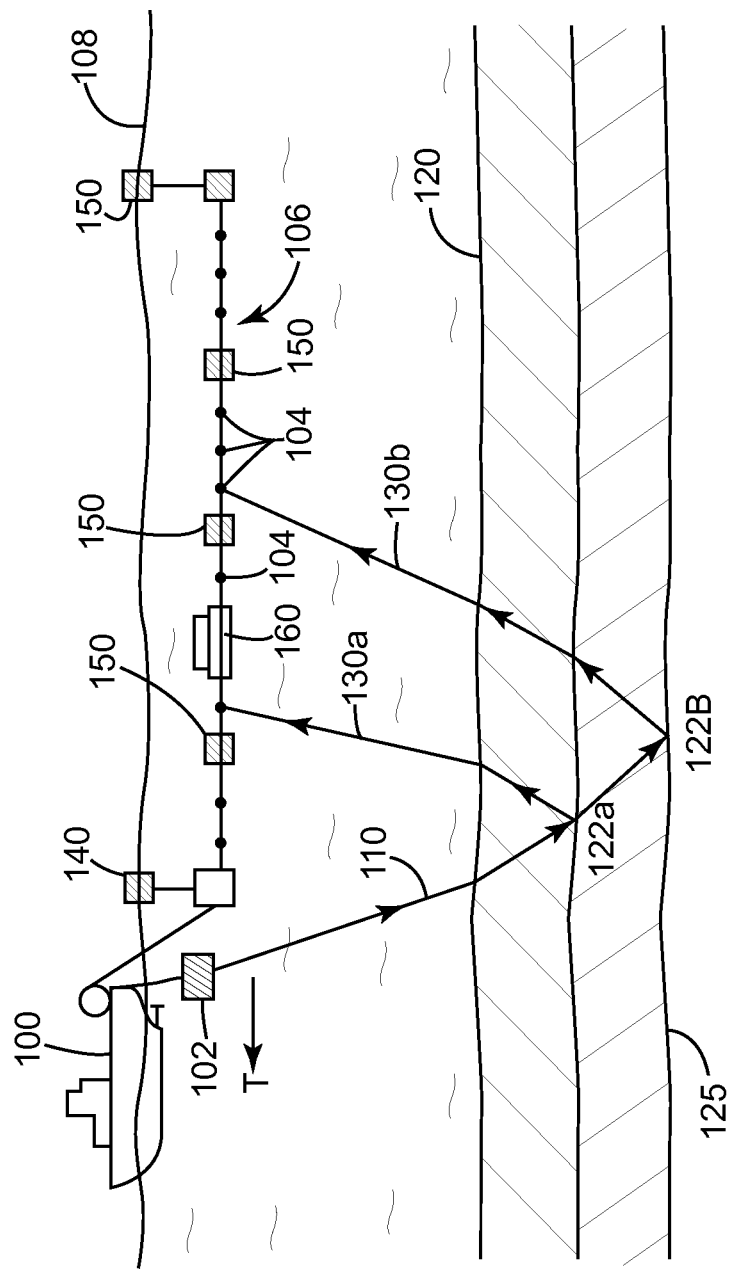
FIG. 1 is a schematic diagram of a conventional marine seismic surveying system.
Figure 2:
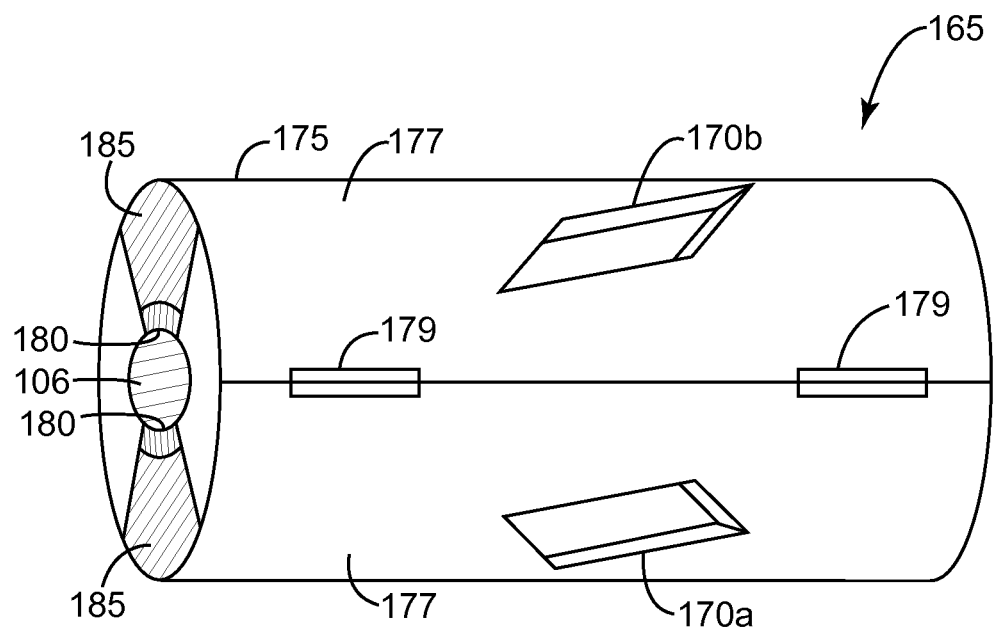
FIG. 2 illustrates a conventional passive streamer cleaning device.
Figure 3:
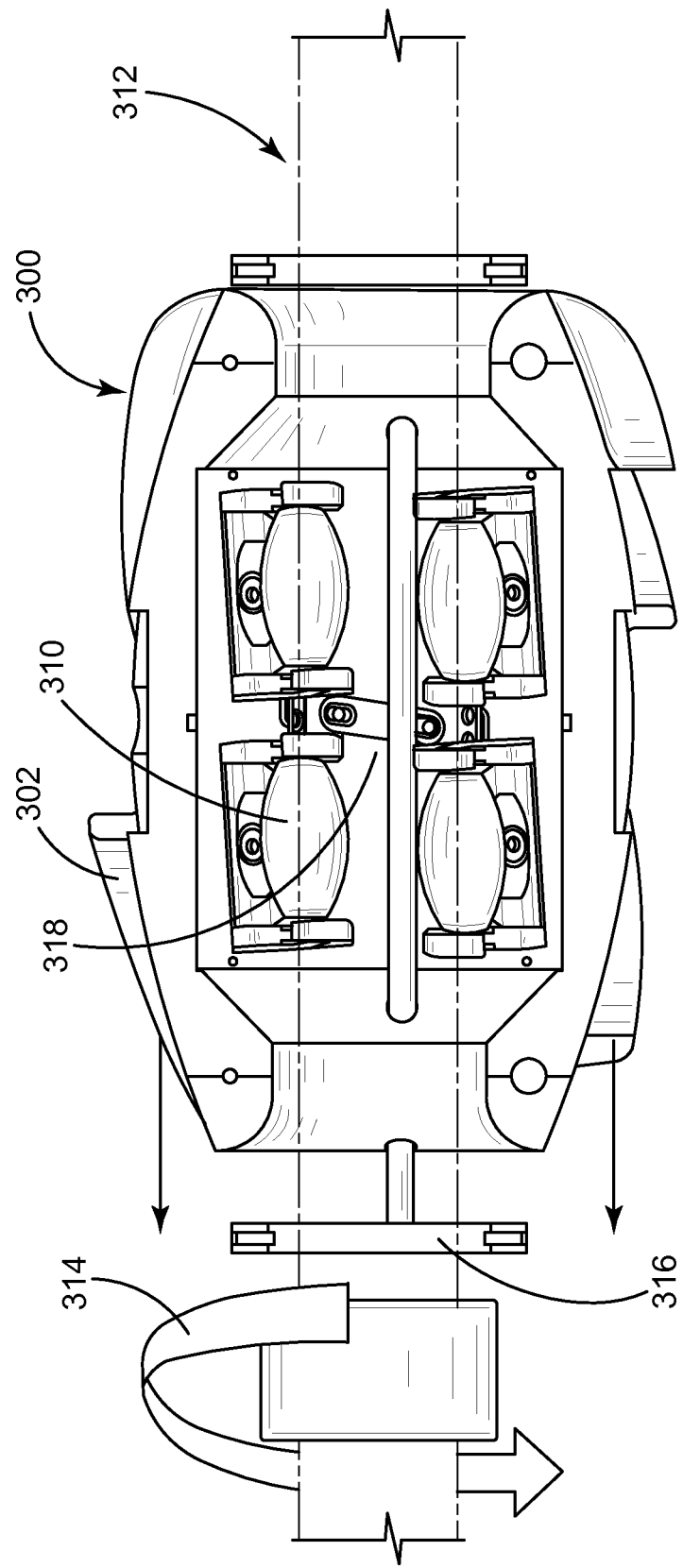
FIG. 3 illustrates an active streamer cleaning device.
Figure 4:
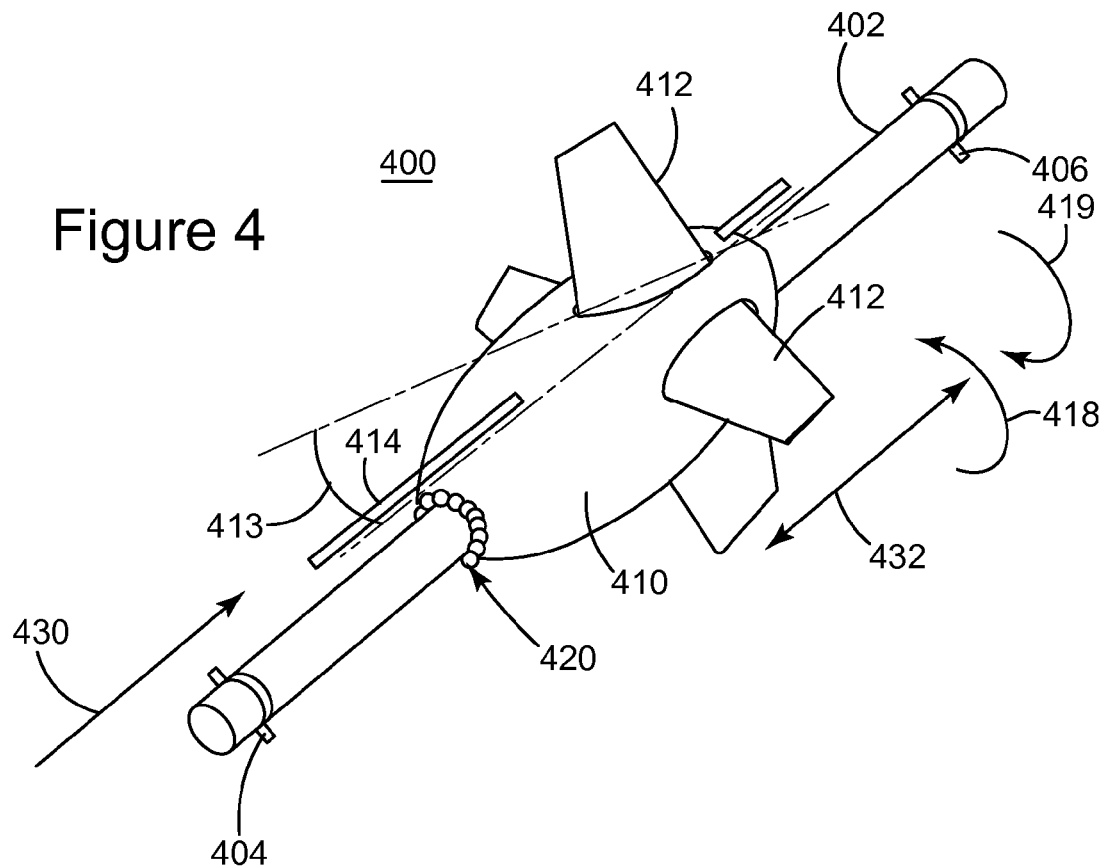
FIG. 4 is a schematic diagram of a cleaning device that has movable wings according to an embodiment.

According to an exemplary embodiment illustrated in FIG. 4, a cleaning device 400 is located around a streamer 402 and configured to autonomously, i.e., without human intervention, move up and down the streamer, between two obstacles (e.g., stoppers 404 and 406). Stoppers 404 and 406 may be any device located on the streamer, e.g., birds, or specific structures attached to the streamer with the only purpose of aiding cleaning device 400, as will be discussed later.

Cleaning device 400 has a body 410 that is configured to support one or more wings 412. A cleaning tool 420, e.g., a brush, a magnet, a container holding an antifouling agent, etc., may be attached to body 410. In one application, the cleaning tool may have an anti-fouling coating or may provide an anti-fouling coating to the streamer. One or more cleaning tools may be located on cleaning device 400. In one application, a first cleaning tool is attached to a first end of the body and a second cleaning tool may be attached to a second end of the body. The two cleaning tools may be identical or different. A switching and locking mechanism 414 is attached to body 410 and determines, when contacting stopper 404 or 406, a change in the wings' orientations (e.g., angle 413). By changing the wings' orientation, as illustrated by arrow 416 in FIG. 5, cleaning device 400 may rotate, like a screw, about streamer 402, along one of the two directions 418 and 419. In other words, wings 412 impart, when interacting with water flow 430, a rotational motion to cleaning device 400. Depending on the orientation of wings 412, cleaning device may rotate clockwise or anticlockwise around streamer 402. This rotational motion is achieved by simply towing the streamer with a certain speed in water. Thus, no engine or power source is necessary for rotating the cleaning device.

However, this rotational motion needs to be (partially) transformed into translation motion, i.e., it needs to make the cleaning device move, back and forth, along a longitudinal axis 432, which is parallel with the streamer. According to an embodiment illustrated in FIG. 6, which shows only a body part 410A, which may be half of body 410, one or more wheels 440 are located inside cleaning device 400. Wheels 440 have one or more axles 442 that make an angle α with a longitudinal axis 450 of the cleaning device. Angle α may be around 5 degrees. However, other values may be used. Once a value is selected for angle α, that value does not change irrespective whether the cleaning device moves up or down along the streamer. In other words, different from existing devices, the orientation of the wheels is fixed relative to the cleaning device's body. The number of wheels and also the number of axels may vary, depending on the size of the streamer, the size of the cleaning device, the towing speed, etc.

This wheels configuration, i.e., their axles making a fixed angle with longitudinal axis 450 of the cleaning device and the longitudinal axis of the streamer, combined with the fact that the wings impart a rotational motion to the cleaning device, results in a translational movement of the cleaning device, similar to a screw that has a given threaded pitch. Thus, in operation, when the wings make the cleaning device to rotate along direction 418, the cleaning device moves along the streamer in the same direction as water flow 430. However, when the wings change their orientation, the cleaning device rotates along direction 419 and then it advances along the streamer along a direction opposite water flow 430 as the wheels orientation does not change.

Figure 5:
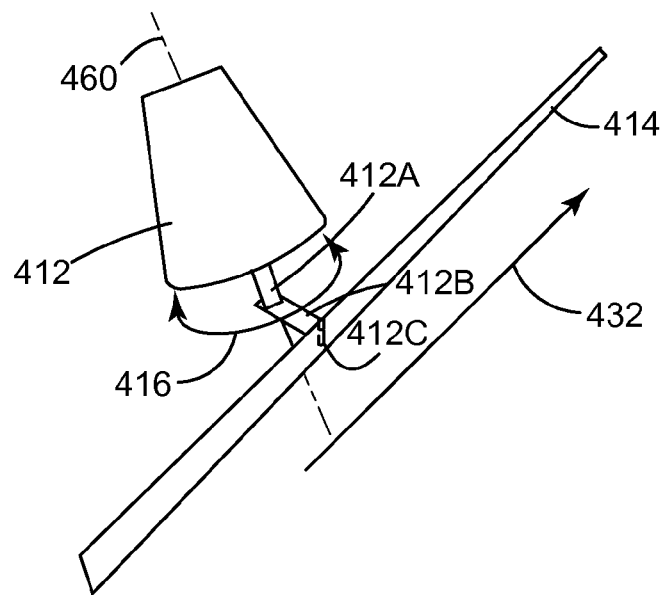
FIG. 5 is a schematic diagram of one wing of a cleaning device according to an embodiment.
Figure 6:
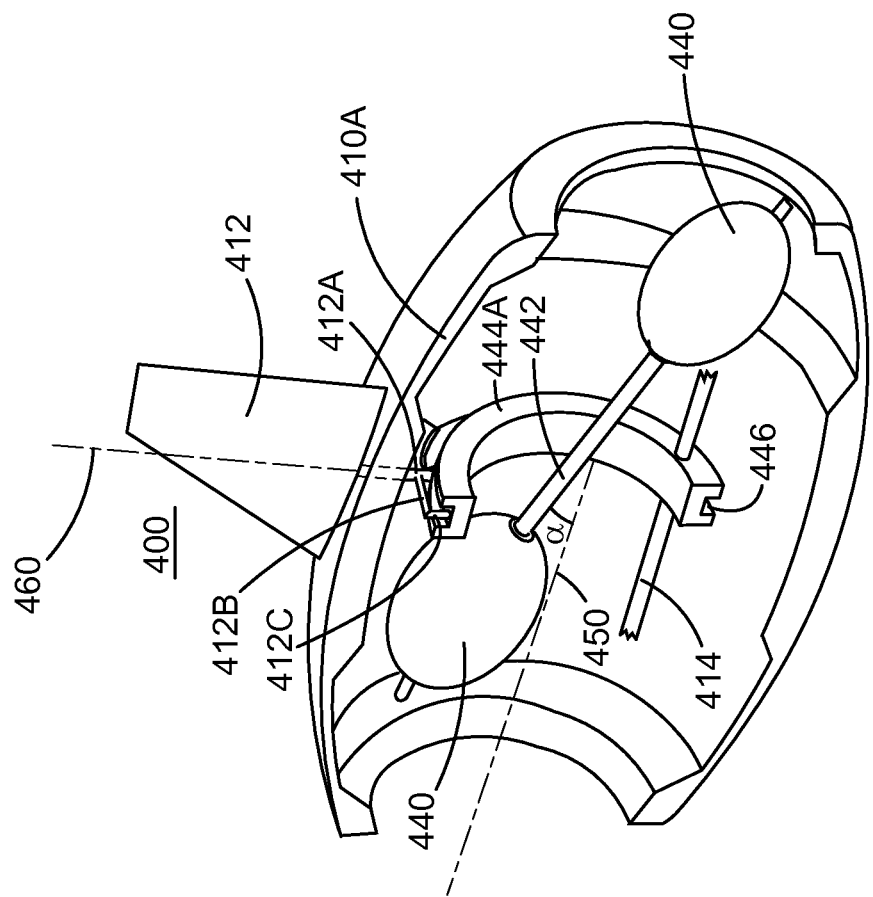
FIG. 6 is a schematic diagram on an inside of a cleaning device according to an embodiment.

Switching and locking mechanism 414 may be responsible for changing the direction of the wings and for locking their orientation when the cleaning device moves between the two stoppers. Switching and locking mechanism 414 is now discussed with regard to FIGS. 5-8. In the embodiment of FIG. 6, a semi-ring 444A having a groove 446 is provided inside body 410. Semi-ring 444A is configured to move along longitudinal axis 450. The other half of the body has a corresponding semi-ring 444B. Each wing has an axis 460 around which it rotates. FIG. 5 shows wing 412 having rotational axis 460 and also a rotatable shaft 412A that is connected to a connecting part 412B. Connecting part 412B has at one end a pin 412C that engages groove 446. Thus, a translational movement of semi-ring 444A determines a rotation of rotatable shaft 412A, i.e., a rotation of wing 412. Depending on which direction semi-ring 444A moves, the wings connected to it takes one of the two orientations which generate a rotational movement of the entire cleaning device.

Figure 7:
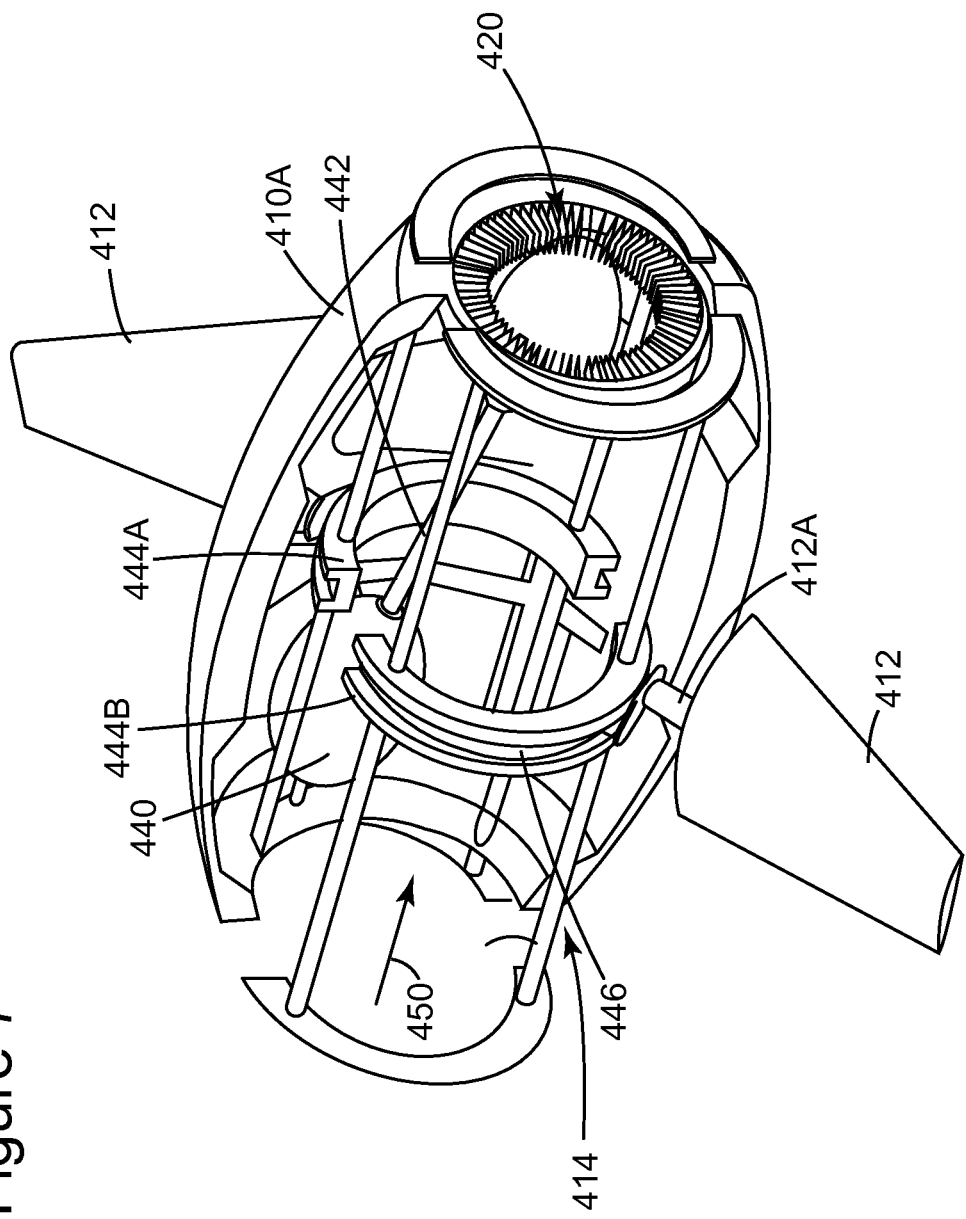
FIG. 7 is a schematic diagram of a cleaning device that advances along one direction of a streamer according to an embodiment.
Figure 8:
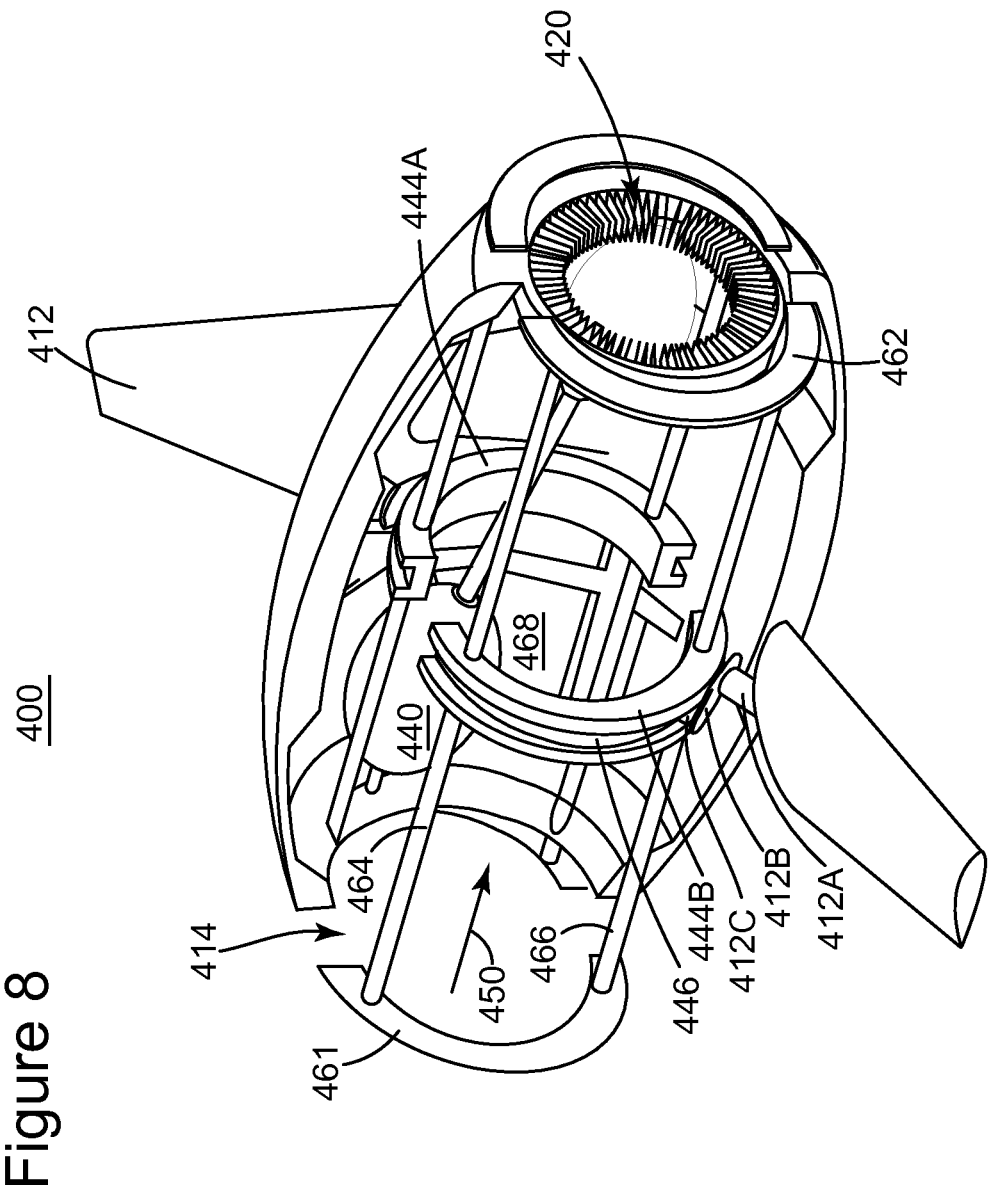
FIG. 8 is a schematic diagram of a cleaning device that advances along another direction of a streamer according to an embodiment.

In this regard, FIG. 7 illustrates semi-ring 444A displaced ahead of semi-ring 444B along longitudinal axis 450 while FIG. 8 shows the opposite situation. FIG. 8 also illustrates various components of switching and locking mechanism 414 according to this embodiment. Switching and locking mechanism 414 may include semicircular front and end stopping elements 461 and 462, which are connected to each other by one or more rods 464 and 466. Rods 464 and 466 fixedly connect to semi-ring 444B. A locking device 468 ensures that an orientation of the wings do not change while the cleaning device advances along the streamer. This mechanism is described in more detail in the following embodiments.

Still with regard to FIG. 8, when cleaning device contacts the bird or a stopper, the stopping element from one of the halves of the body, that protrudes the most, is pushed back and the other stopping element from the other half of the body takes the most protruding position. This switch in positions makes the two semi-rings 444A and 444B to move in opposite directions along longitudinal axis 450, thus switching the wings' orientations. This switch makes the cleaning device to change its rotation along the streamer and to start again cleaning the streamer, but in the opposite direction.

Figure 9:
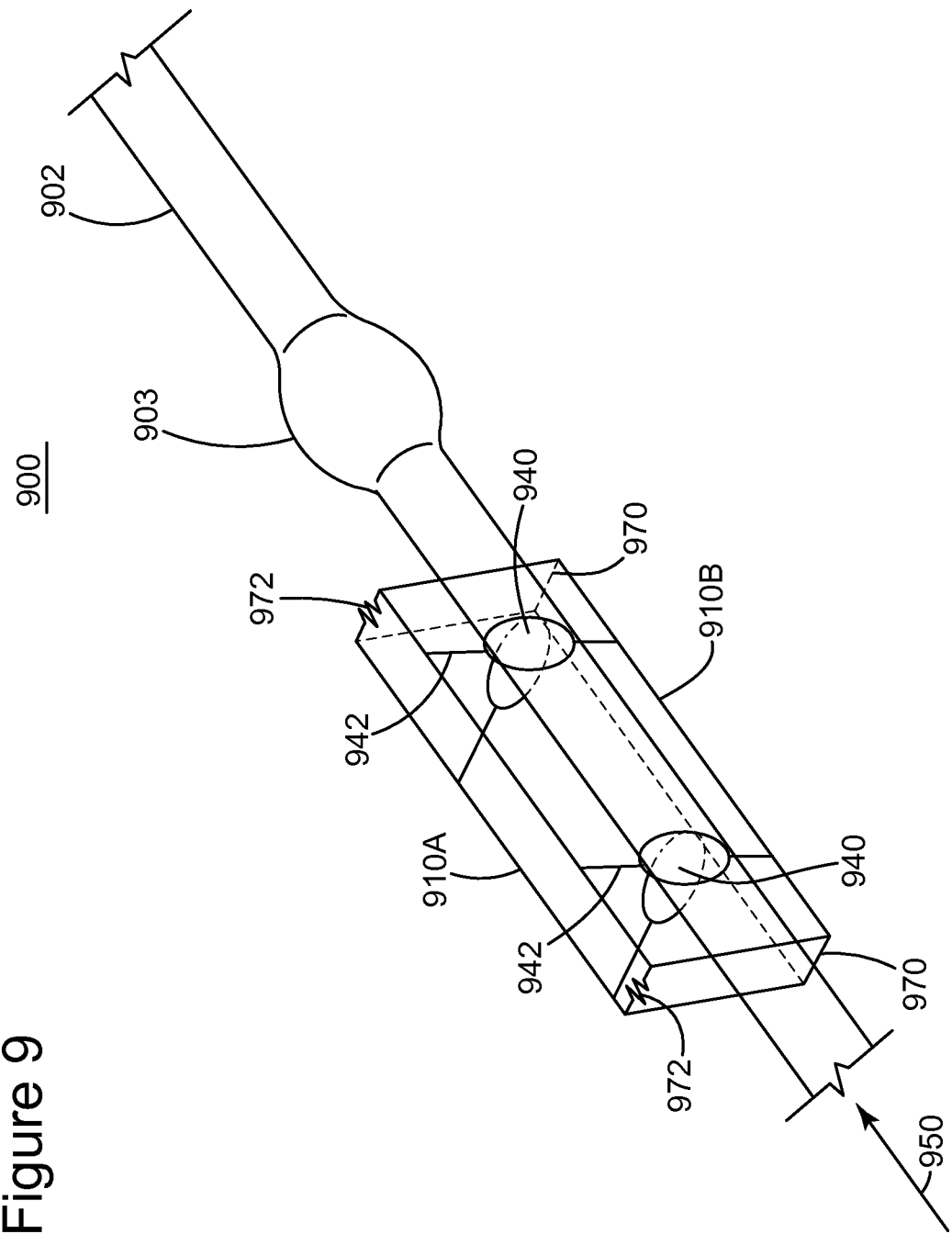
FIG. 9 is a schematic diagram of connecting body parts of a cleaning device around a streamer according to an embodiment.

According to another embodiment illustrated in FIG. 9, there are portions of the streamer that have a larger diameter than others. Such a portion 903 is shown in FIG. 9 along streamer 902. FIG. 9 also shows body 410 being formed of two body parts 910A and 910B. The two body parts 910A and 910B are fixedly connected to each other with connecting parts 970 (e.g., a hinge), at one side, and with deformable members 972 at the opposite side. In this way, when wheels 940 encounter the enlarged portion 903, the two body parts 910A and 910B slightly move apart from each other for allowing enlarged portion 903 in between while contact between wheels 940 and streamer is maintained at all times. This schematic diagram shows one possible embodiment for overcoming obstacles encountered along the streamer. However, as discussed next, other embodiments have different approaches for dealing with these enlarged portions.

Figure 10:
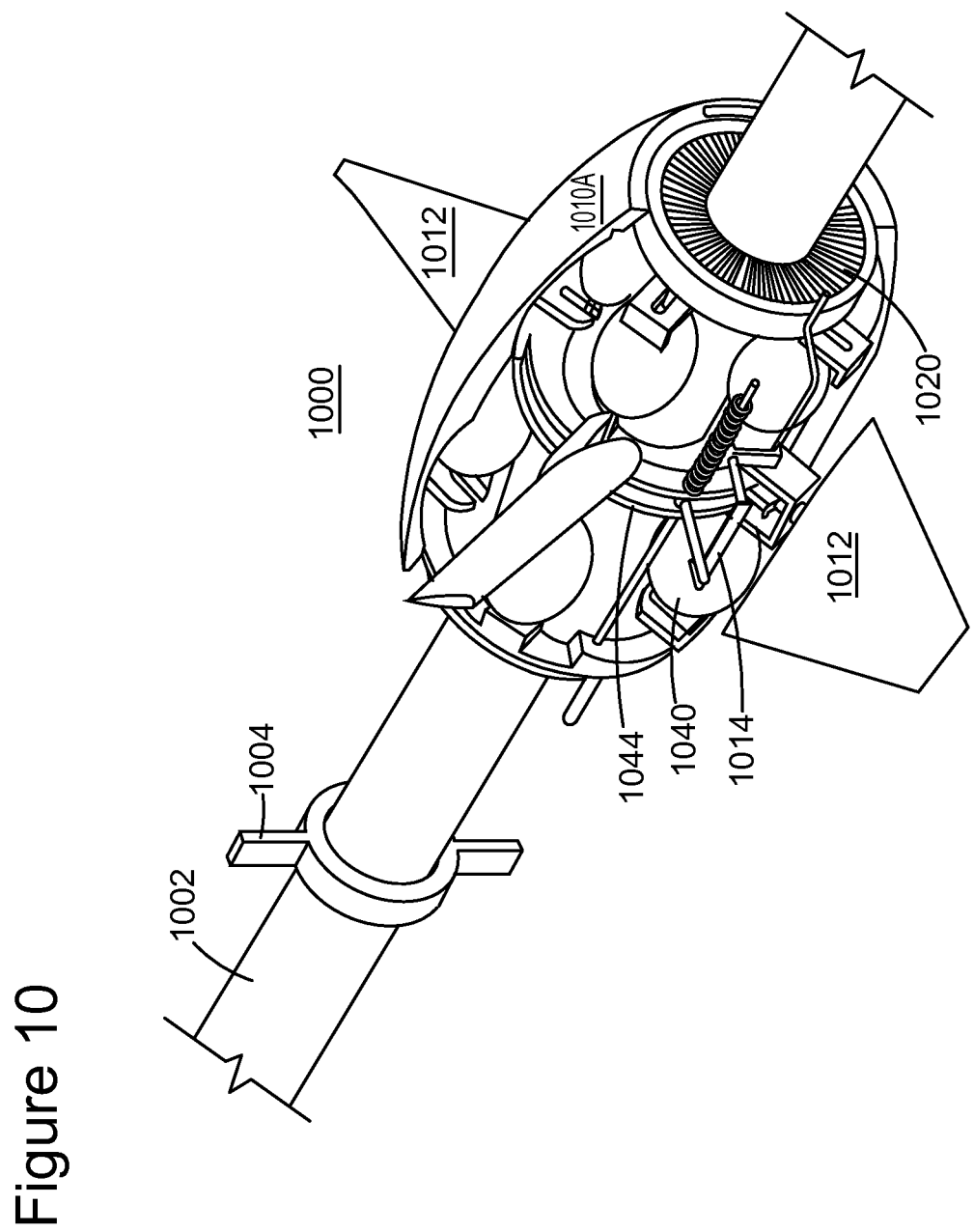
FIG. 10 is a schematic diagram of a cleaning device according to another embodiment.

According to another embodiment, FIG. 10 shows a cleaning device 1000 that also has plural wings 1012 that change their orientation after contacting stoppers 1004 and 1006. FIG. 10 shows internal wheels 1040, e.g., two wheels per wing, switching and locking mechanism 1014 and ring 1044 that ensures that wings' orientation is changed when contacting stopper 1004 and unchanged when advancing along the streamer. Switching and locking mechanism 1014 uses in this embodiment a rotational motion for changing the orientation of the wings, as now discussed. This is opposite to the embodiment discussed in FIGS. 7 and 8 in which a translational motion of the switching and locking mechanism 414 determined a change in the wings' orientation.

Figure 11A:
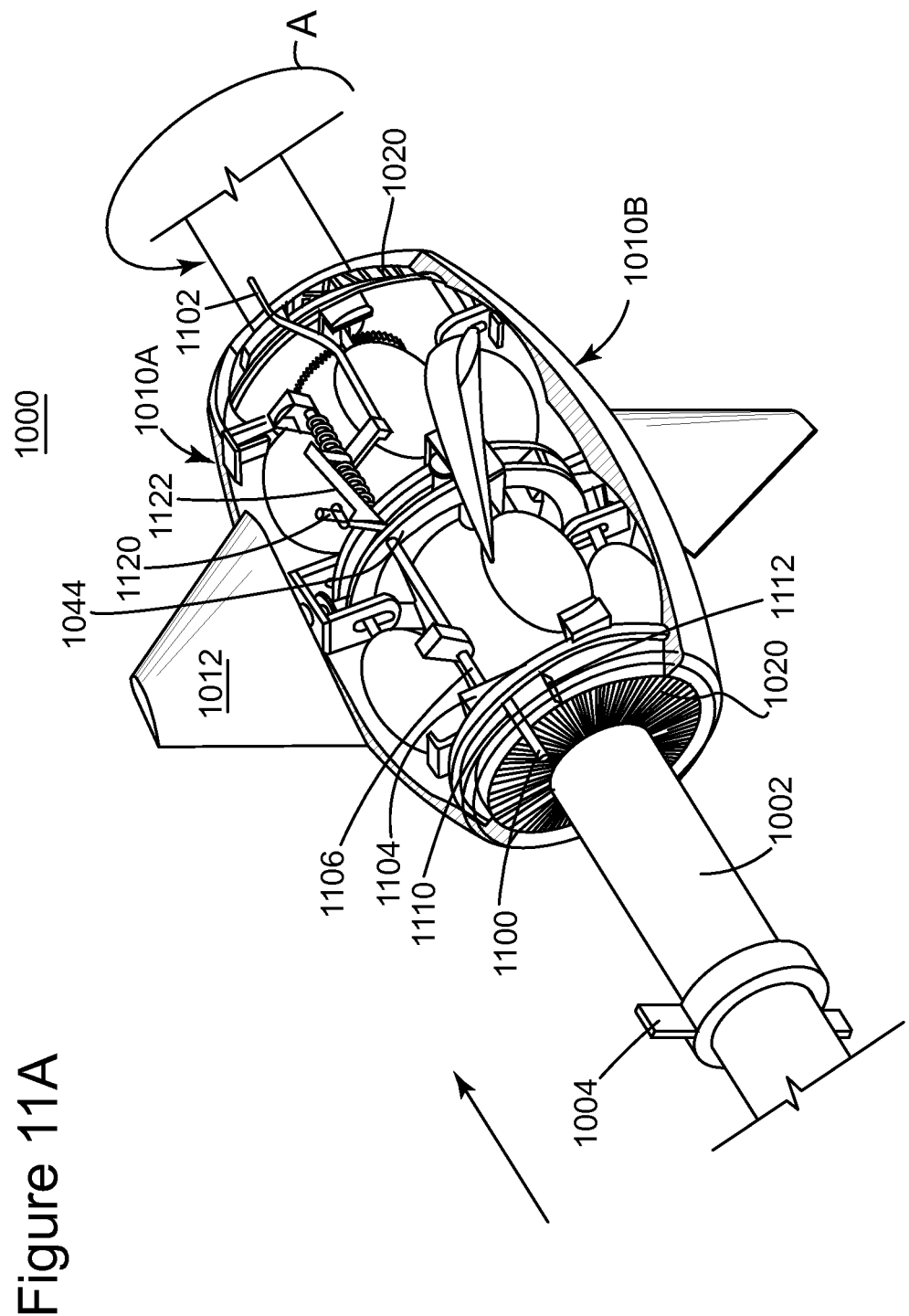
FIGS. 11A-E illustrated how a cleaning device operates between two obstacles along a streamer according to an embodiment.

FIG. 11A shows cleaning device 1000 moving toward stopper 1004 while rotation along direction A about streamer 1002. As illustrated in FIG. 11A, ring 1044 is configured to slide along longitudinal axis 1050 when activated by switching and locking mechanism 1014. This translational motion of the switching and locking mechanism 1014 determines the wings' change in orientation. Wheels 1040, as in the previous embodiments, have axels that make an angle with longitudinal axis 1050 but the angle is fixed during the up and down movement of the cleaning device along the streamer.

Switching and locking mechanism 1014 includes at least one pin 1100 protruding at one end of cleaning device 1000 and another pin 1102 protruding at the other end of the cleaning device. Each of these two pins 1100 and 1102 are configured to engage with corresponding stoppers 1004 and 1006 (not shown) for modifying the wings' orientation. Pin 1100 is fixedly engaged with a wedge part 1104 and configured to rotate relative to body parts 1010A and 1010B. In other words, when cleaning device 1000 is in contact with stopper 1004, as illustrated in FIG. 11B, body parts 1010A and 1010B continue to rotate around direction A, which make pin 1100 and wedge part 1104 to rotate relative to body part 1010A.

Figure 11B:
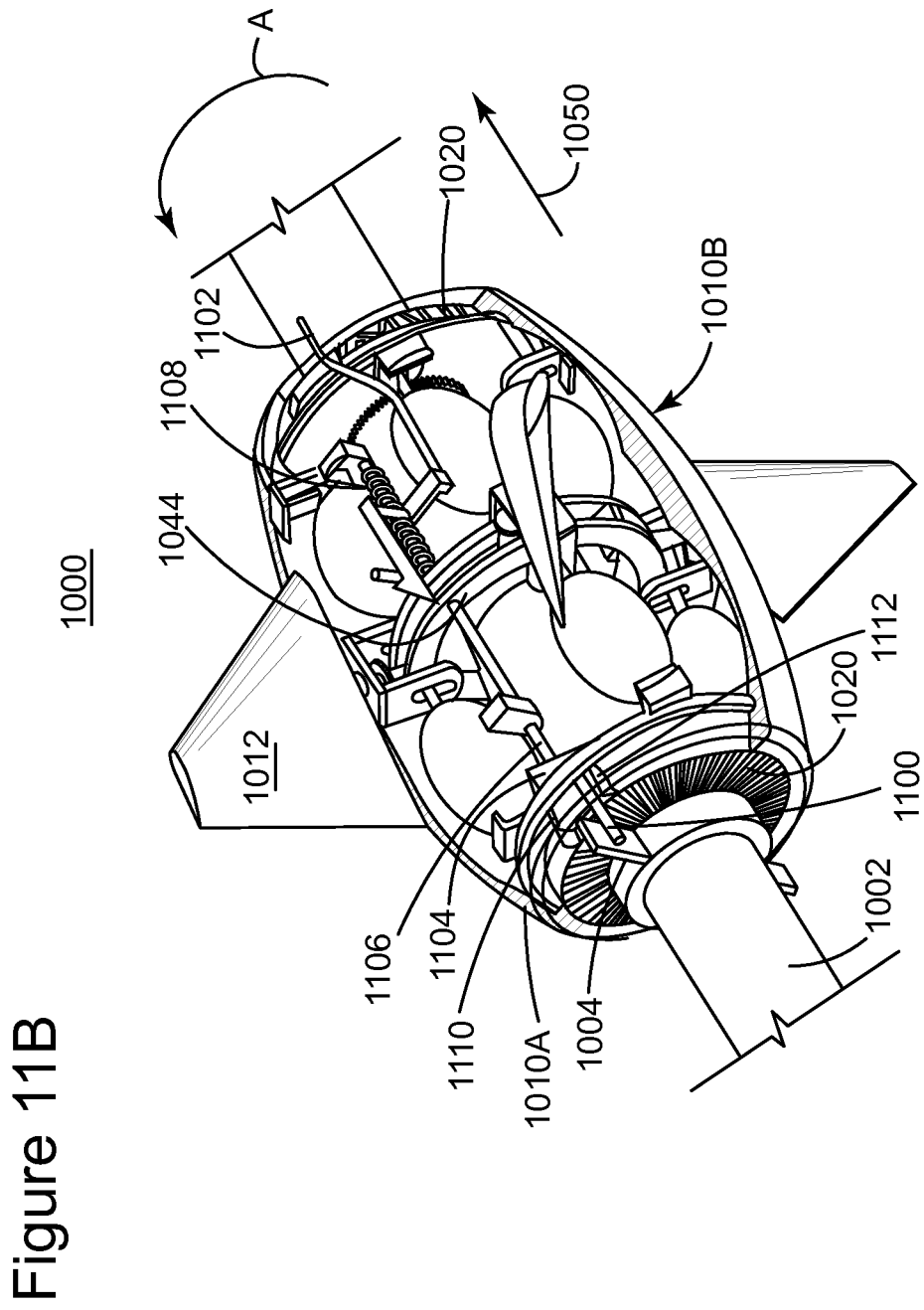

FIGS. 11A and 11B show that pin 1100 is free to move between reference points 1110 and 1112. FIG. 11A shows pin 1100 at reference point 1110 while FIG. 11B shows pin 1100 close to reference point 1112. This relative rotational motion of body part 1010A and pin 1100 determines wedge part 1104 to push rod 1106, which is fixedly connected with to ring 1044, along longitudinal axis 1050. Thus, while body part 1010A rotates and pin 1100 has engaged stopper 1004, the orientation of the wings is changing due to ring 1044 sliding along longitudinal axis 1050. While sliding along longitudinal axis 1050, rod 1106 compresses a spring 1108, which is illustrated in more detail in FIG. 11C. This compression continues until pin 1100 reaches reference point 1112, at which time, locking pin 1120 is engaged by lever 1122 thus, fixing the new orientation of the wings in place. Locking pin 1120 is fixedly attached to rod 1106 and spring 1108 is wounded around rod 1106. Lever 1122 is connected to pin 1102 so that a rotation of pin 1102 around the streamer, when contacting the other stopper 1006, releases locking pin 1120.

Thus, when in operation, cleaning device 1000 executes the following steps. Starting with FIG. 11A, cleaning device 1000 moves toward stopper 1004, thus opposite longitudinal axis 1050, while rotating along direction A. Lever 1122 is not engaging locking pin 1120. Spring 1108 is biasing ring 1044 toward stopper 1004 so that the wings have a first orientation. When pin 1100 contacts stopper 1004, as illustrated in FIG. 11B, the rotation of body part 1010A determines pin 1100 to move from reference position 1110 to position 1112, which results in wedge 1104 pushing rod 1106 along longitudinal direction 1050. This movement of rod 1106 makes ring 1044 to move along longitudinal axis 1050, thus changing the wings' orientation from the first orientation to a second orientation. The second orientation is locked in place by lever 1122 engaging locking pin 1120. At the same time, spring 1108 is compressed and also locked in place by the combination of lever 1122 and locking pin 1120.

Figure 11C:
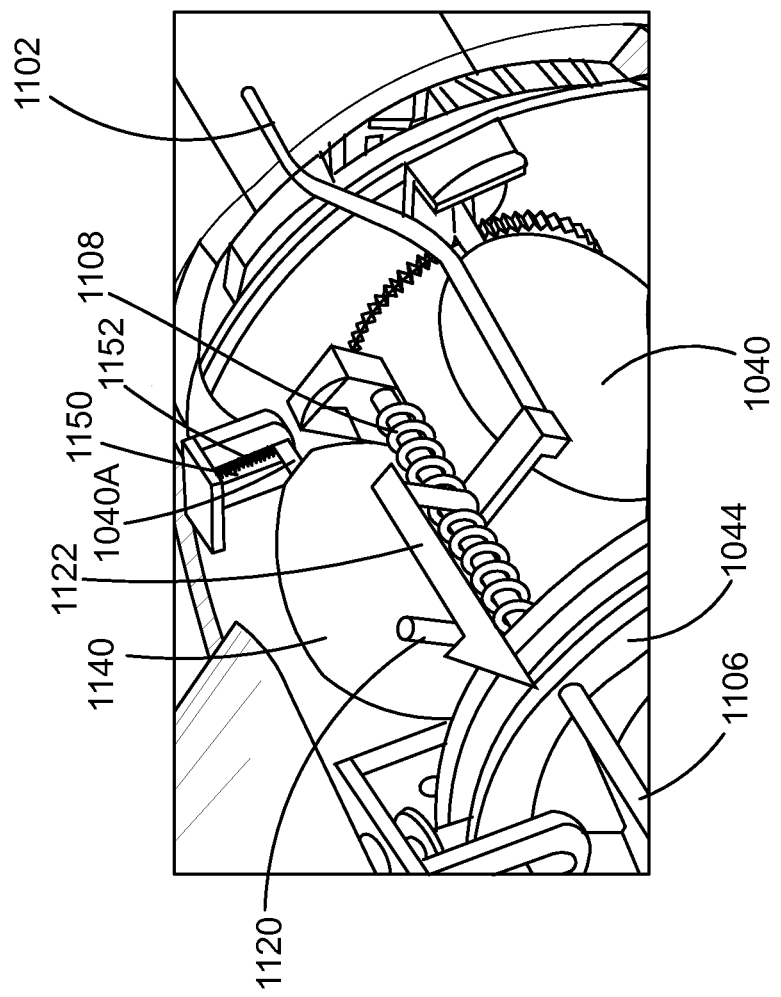
Figure 11D:
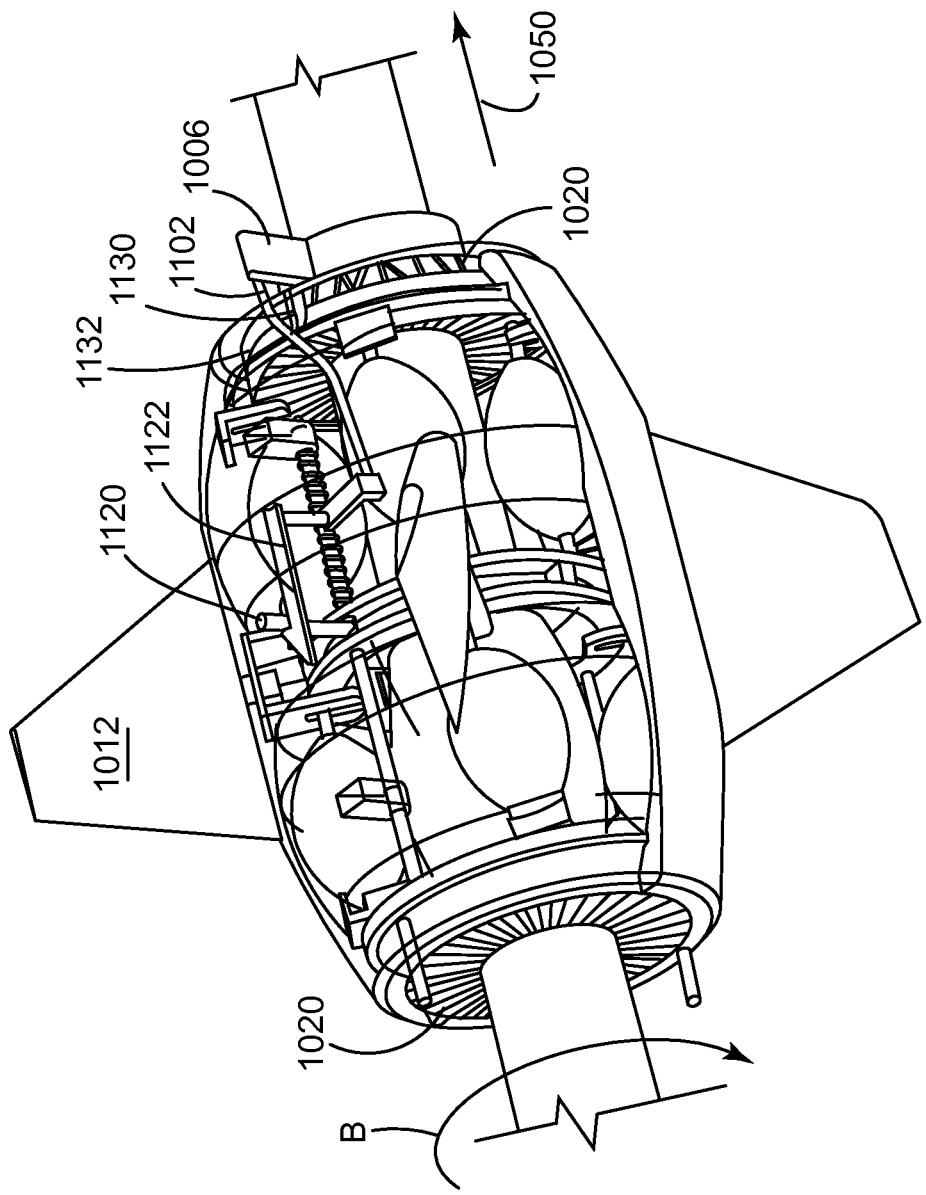
Figure 11E:
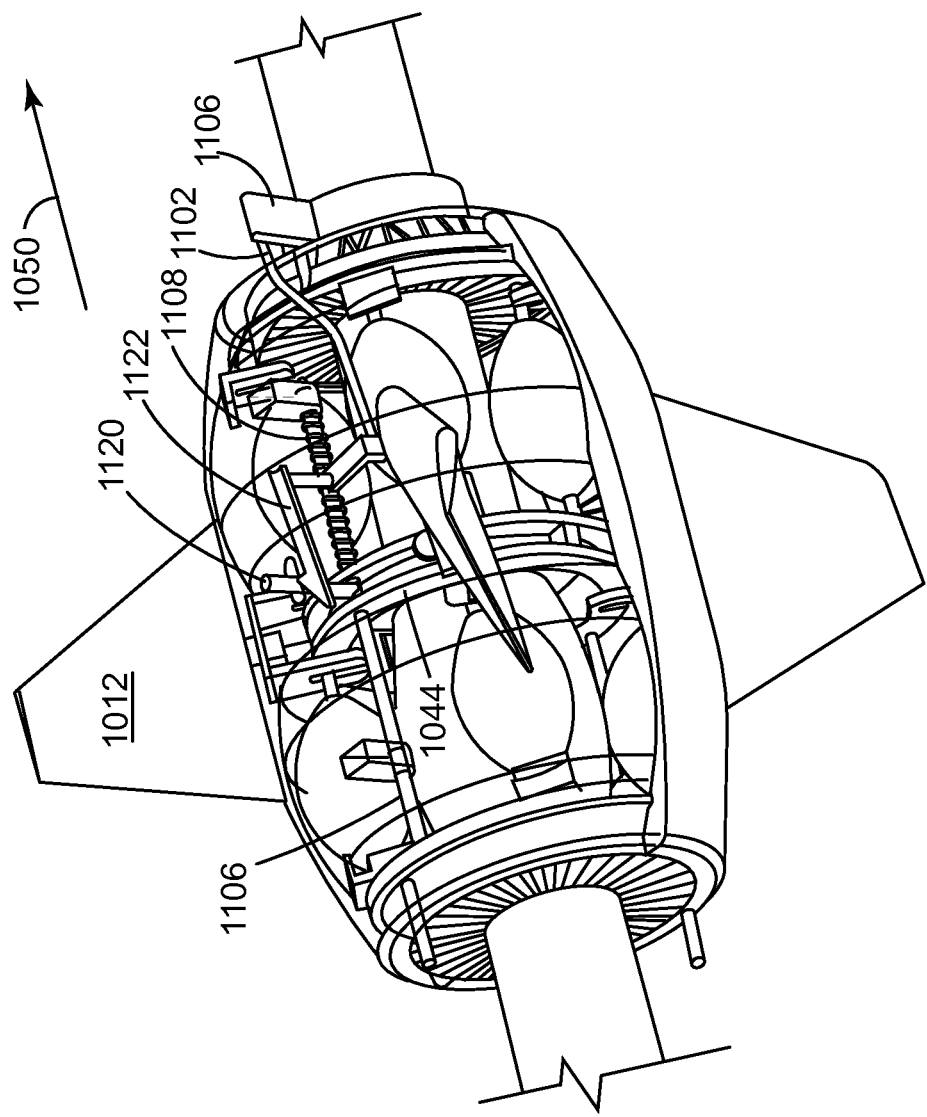

Due to the wings' second orientation, the cleaning device starts to spin around streamer 1002 along direction B, as illustrated in FIG. 11D. Due to the fact that wheels 1040 do not change their orientation, cleaning device now advances along longitudinal axis 1050. During this translation and rotation motion, cleaning tools 1020 clean streamer 1002. When pin 1102 contacts stopper 1006, the translational motion stops but the rotational motion of the cleaning device continues. Due to the rotational motion, pin 1102 moves, as illustrated in FIGS. 11D and 11E, from a reference position 1130 to a reference position 1132. This rotation of pin 1102 makes lever 1122 to rotate and release locking pin 1120. Thus, compressed spring 1108 moves rod 1106 opposite to longitudinal axis 1050, making ring 1044 to move together with rod 1106. This movement of ring 1044 makes the wings' orientation to change from the second orientation to the first orientation. Thus, cleaning device again starts to move toward stopper 1002, cleaning again the streamer. This back and forth motion of the cleaning device may continue for as long as there is a water flow. In one application, there is a single ring 1044 that engages all the wings and, thus, the wings are switched between the first and second orientations at the same time.

The embodiment illustrated in FIGS. 11A-E also has a mechanism for allowing the cleaning device to move past portions of the streamer having a diameter larger than normal. FIG. 11C shows that an end of an axle 1040A of a wheel 1040 is placed in a slot 1150 so that the end can move up and down the slot. That end may be biased by a spring 1152. Thus, when a streamer portion with a larger than normal diameter is encountered, one end of the axle 1040A moves away from the streamer for allowing wheel 1040 to accommodate the larger diameter.

Figure 12:
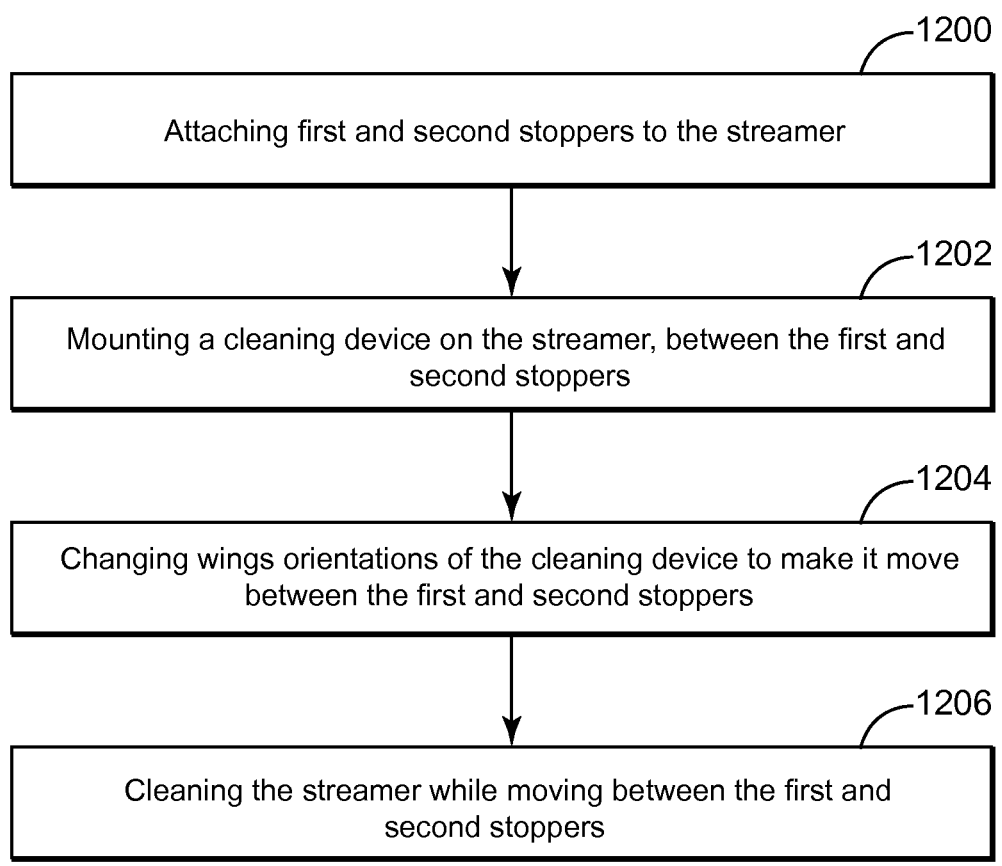
FIG. 12 is a flowchart of a method for cleaning a portion of a streamer according to an embodiment.

According to an embodiment illustrated in FIG. 12, there is a method for cleaning a streamer while being towed under water. The method includes a step 1200 of attaching first and second stoppers to the streamer, a step 1202 of mounting a cleaning device on the streamer, between the first and second stoppers, a step 1204 of changing wings orientations of the cleaning device to make it move between the first and second stoppers, and a step 1206 of cleaning the streamer while moving between the first and second stoppers.

The disclosed exemplary embodiments provide a cleaning device for cleaning portions of a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cleaning device for cleaning a marine element that is towed in water, the cleaning device comprising:

a body configured to enclose the marine element;
at least one wing attached to the body and configured to impart translational and rotational motion to the body when interacting with the water;
a switching and locking mechanism configured to change an orientation of the at least one wing between a first orientation and a second orientation when contacting a stopper and also to lock the selected orientation;
rotating means attached to an internal surface of the body and configured to contact the marine element, the rotating means having axles that make a fix angle with a longitudinal axis of the body; and
a cleaning tool attached to the body and configured to clean the marine element,
wherein the first orientation of the at least one wing makes the body to rotate along a first direction about the marine element and the second orientation of the at least one wing makes the body to rotate along a second direction about the marine element.

2. The cleaning device of claim 1, wherein the fix angle is about 5 degrees.

3. The cleaning device of claim 1, wherein the switching and locking mechanism comprises:
first and second semi-rings located inside the body and configured to move along longitudinal axis one relative to another.

4. The cleaning device of claim 3, wherein each of the first and second semi-rings includes a groove that accommodates a pin associated with a rotatable shaft of the at least one wing.

5. The cleaning device of claim 4, wherein a movement of the first semi-ring along the longitudinal axis makes wings associated with the first semi-ring to rotate relative to the rotatable shaft changing their orientation.

6. The cleaning device of claim 5, wherein the switching and locking mechanism further comprises:
a locking device configured to lock the selected orientation of the wings until the switching and locking mechanism contacts a stopper.

7. The cleaning device of claim 1, wherein the body includes first and second body parts fixedly attached to one side and attached by a spring member at an opposite side such that when traversing a portion of the marine element with a larger diameter than another portion, the spring member accommodates the larger diameter portion.

8. A cleaning device for cleaning a marine element that is towed in water, the cleaning device comprising:
a body configured to enclose the marine element;
at least one wing attached to the body and configured to impart translational and rotational motion to the body when interacting with the water;
a ring configured to change an orientation of the at least one wing between a first orientation and a second orientation when contacting stoppers when sliding along a longitudinal axis of the body;
a switching and locking mechanism configured to actuate the ring and to lock in place the selected orientation of the at least one wing;
rotating means attached to an internal surface of the body and configured to contact the marine element, the rotating means having axles that make a fix angle with the longitudinal axis of the body; and
a cleaning tool attached to the body and configured to clean the marine element,
wherein the first orientation of the at least one wing makes the body to rotate along a first direction about the marine element and the second orientation of the at least one wing makes the body to rotate along a second direction about the marine element.

9. The cleaning device of claim 8, wherein the switching and locking mechanism comprises:
first and second pins located at opposite ends of the body and configured to engage with corresponding stoppers, wherein the first pin is configured to slide relative to the body from a first reference position to a second reference position;
a wedge part connected to the first pin; and
a rod having an end in contact with the wedge part and a part fixedly attached to the ring,
wherein a circular movement of the wedge part relative to the body translates the rod along the longitudinal axis and slides the ring along the longitudinal axis, achieving one of the first and second orientation of the at least one wing.

10. The cleaning device of claim 9, wherein the switching and locking mechanism further comprises:
a spring attached to the rod; and
a locking pin fixedly connected to the rod.

11. The cleaning device of claim 10, wherein the switching and locking mechanism further comprises:
a lever connected to the second pin and configured to pivot when the second pin engages the stopper so that lever disengages locking pin and unlocks it, achieving the other one of the first and second orientation of the at least one wing.

12. The cleaning device of claim 8, wherein an end of an axel of the rotating means is configured to slide inside a slot, along a radial direction of the marine element, and the end is biased by a spring member so that the rotating means accounts for a larger diameter of the marine element.

13. A marine seismic system comprising:
a streamer;
first and second stoppers mounted on the streamer; and
a cleaning device mounted on the streamer and configured to travel along the streamer, between the first and second stoppers and to clean the streamer,
wherein the cleaning device comprises,
a body configured to enclose the streamer,
plural wings attached to the body and configured to impart translational and rotational motion to the body when interacting with the water,
a ring configured to change an orientation of the wings between a first orientation and a second orientation when contacting the first and second stoppers when sliding along a longitudinal axis of the body,
a switching and locking mechanism configured to actuate the ring and to lock in place the selected orientation of the wings,
wheels attached to an internal surface of the body and in contact with the streamer, the wheels having axles that make a fix angle with the longitudinal axis of the body, and
a cleaning tool attached to the body and configured to clean the streamer,
wherein the first orientation of the plural wings makes the body to rotate along a first direction about the streamer and the second orientation of the plural wings makes the body to rotate along a second direction about the streamer.

14. The system of claim 13, wherein the angle is constant during back and forth movement of the cleaning device.

15. The system of claim 13, wherein the switching and locking mechanism comprises:

first and second pins located at opposite ends of the body and configured to engage with corresponding stoppers, wherein the first pin is configured to slide relative to the body from a first reference position to a second reference position;

a wedge part connected to the first pin;

a rod having a first end in contact with the wedge part and a part fixedly attached to the ring, wherein a circular movement of the wedge part relative to the body translates the rod along the longitudinal axis and slides the ring along the longitudinal axis, achieving one of the first and second orientation of the wings;

a spring attached to the rod;

a locking pin fixedly connected to the rod; and a lever connected to the second pin and configured to pivot when the second pin engages the stopper so that lever disengages locking pin and unlocks it, achieving the other one of the first and second orientation of the wings.

16. The system of claim 13, wherein an end of an axel of a wheel is configured to slide inside a slot and the end is biased by a spring member so that the wheel accounts for a larger diameter of the streamer.

17. A method for cleaning a seismic element while being towed in water, the method comprising:

attaching first and second stoppers to the seismic element;

mounting a cleaning device on the seismic element, between the first and second stoppers;

changing a wing orientation of the cleaning device to make it move back and forth between the first and second stoppers; and cleaning the seismic element while moving between the first and second stoppers, wherein the cleaning device includes, a body configured to enclose the seismic element, plural wings attached to the body and configured to impart translational and rotational motion to the body when interacting with the water, a ring configured to change an orientation of the wings between a first orientation and a second orientation when contacting the first and second stoppers when sliding along a longitudinal axis of the body, a switching and locking mechanism configured to actuate the ring and to lock in place the selected orientation of the wings, rotating means attached to an internal surface of the body and configured to contact the seismic element, the rotating means having axles that make a fix angle with the longitudinal axis of the body, and a cleaning tool attached to the body and configured to clean the seismic element.

18. The method of claim 17, wherein the first orientation of the plural wings makes the body to rotate along a first direction about the seismic element and the second orientation of the plural wings makes the body to rotate along a second direction about the seismic element.

19. The method of claim 17, wherein the switching and locking mechanism comprises:

first and second pins located at opposite ends of the body and configured to engage with corresponding stoppers, wherein the first pin is configured to slide relative to the body from a first reference position to a second reference position;

a wedge part connected to the first pin;

a rod having a first end in contact with the wedge part and a second end fixedly attached to the ring, wherein a circular movement of the wedge part relative to the body translates the rod along the longitudinal axis and slides the ring along the longitudinal axis, achieving one of the first and second orientation of the wings;

a spring attached to the rod;

a locking pin fixedly connected to the rod; and a lever connected to the second pin and configured to pivot when the second pin engages the stopper so that lever disengages locking pin and unlocks it, achieving the other one of the first and second orientation of the wings.

\* \* \* \* \*